J. KENNEDY.
SHAFT COUPLING.
APPLICATION FILED APR. 7, 1916.
1,194,028.
Patented Aug. 8, 1916.
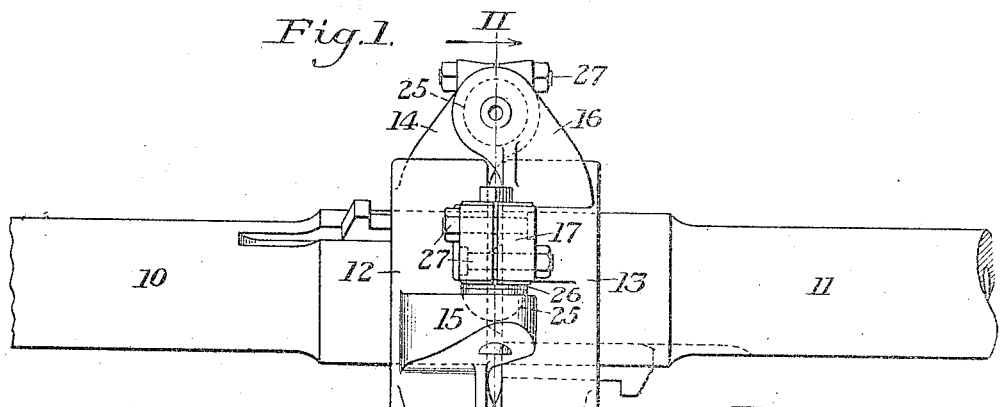
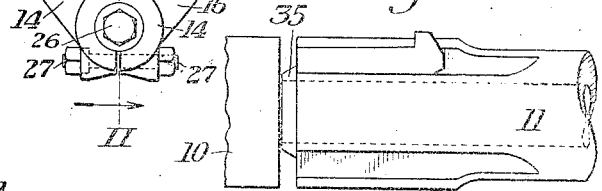
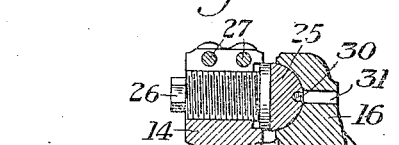
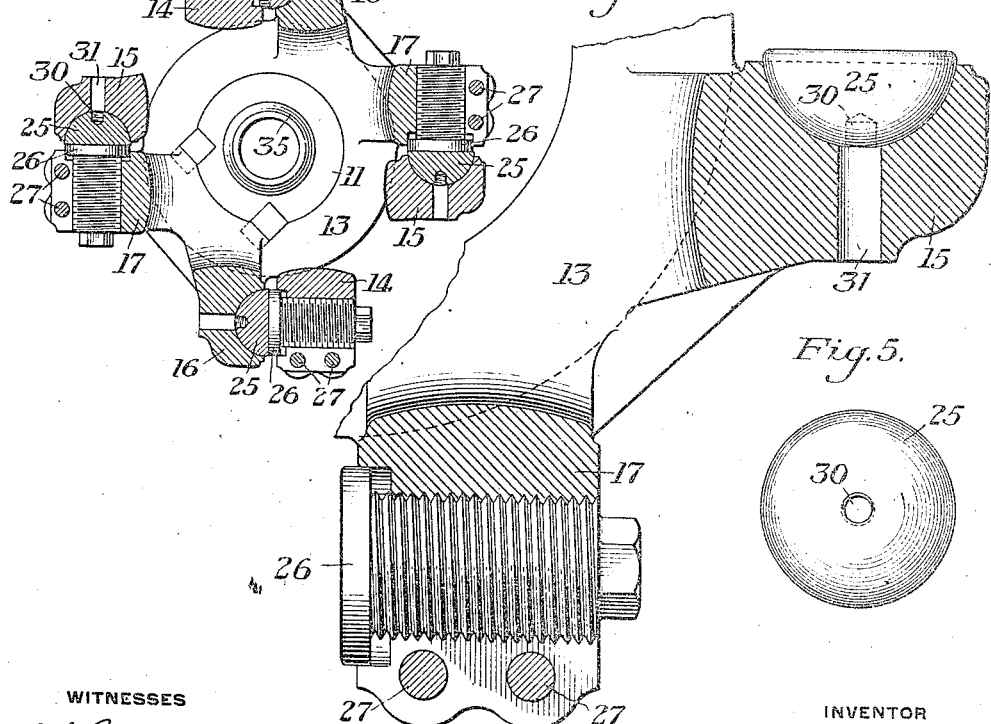
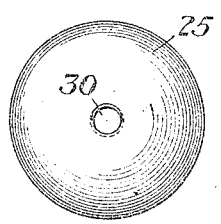
WITNESSES
INVENTOR

UNITED STATES PATENT OFFICE.

JULIAN KENNEDY, OF PITTSBURGH, PENNSYLVANIA.

SHAFT-COUPLING.

1,194,028.  Specification of Letters Patent.  Patented Aug. 8, 1916.

Application filed April 7, 1916. Serial No. 89,587.

*To all whom it may concern:*

Be it known that I, JULIAN KENNEDY, a citizen of the United States, residing at Pittsburgh, Allegheny county, Pennsylvania, have invented a new and useful Shaft-Coupling, of which the following is a full, clear, and exact description, reference being had to the accompanying drawings, forming part of this specification, in which—

Figure 1 is a side elevation of my shaft coupling. Fig. 2 is a section, taken along the line II—II of Fig. 1. Fig. 3 is an elevation of the shafts with the coupling hubs removed. Fig. 4 is an enlarged detail, taken on the same section line as Fig. 2, and Fig. 5 is a detail view showing one of the hemispherical bearing blocks.

The invention relates to shaft couplings, and more particularly to flexible shaft couplings for rolling mills.

The present invention is an improvement in the type of shaft couplings shown in my Patent No. 666,144, of January 5, 1901.

The object of the invention is to improve this type of shaft couplings to reduce the wear on the parts and to afford provision for relatively adjusting the bearing surfaces of the coupling to make a tight coupling and also to take up the wear, thus preventing back lash. In reversing rolling mills it is particularly important that back lash of the coupling should be prevented. With the above objects in view, the present invention consists in the shaft coupling hereinafter described and particularly pointed out in the claims.

Referring to the illustrated embodiment of the invention, the two shafts 10 and 11, which may be taken as the driving and driven shafts, respectively, are connected by means of the flexible shaft coupling. Hubs or spiders 12 and 13 are mounted on the ends of the shafts 10 and 11, respectively. The hubs 12 and 13 are similar in construction and have a plurality of interfitting arms. The arms on the hub 12 are indicated by reference numerals 14, 14 and 15, 15 in Fig. 2, while the arms on the hub 13 are indicated by reference numerals 16, 16 and 17, 17, respectively. Some of the inter-fitting arms have recesses in which fit hemispherical bearing blocks or brasses 25, which are preferably made of phosphor bronze. The hemispherical recesses permit the bearing blocks to have a limited rocking movement with relation to their supporting arms. Coöperating with the bearing blocks 25 are flat-faced hardened steel bearing pins 26 having flat bearing surfaces fitting against the flat bearing surfaces of the blocks 25. The flat engaging faces of the blocks 25 and the pins 26 form forwardly and backwardly facing bearing surfaces (taken in the direction of rotation of the shafts) which lie in planes extending radially through the shaft axes. When the driving and driven shafts are not in alinement the bearing blocks 25 rock in their sockets and the flat bearing surfaces of the blocks 25 and pins 26 slide on each other as the shafts revolve, as will be readily understood by one skilled in this art. The hemispherical sockets allow the flat bearing surfaces of the blocks to automatically adjust or fit themselves against the flat bearing surfaces of the pins 26.

The pins 26 are threaded in their supporting arms so as to be adjustable toward and from the bearing blocks 25. The relative adjustment thus afforded between the bearing surfaces of each coöperating pair of blocks and pins, permits a close fit between such surfaces when the coupling is installed and also affords provision for taking up the wear on the surfaces in use. When a pin 26 is adjusted toward its coöperating bearing block 25, the bearing block finds its natural seat in its supporting socket with its flat face fitting accurately against the flat face of the pin. Thus if one portion of the flat bearing surface of a block or a pin should wear faster than another portion, the spherical supporting socket of the block permits the block to automatically fit flat against the face of the pin when the pin is turned up to take up wear. In reversible rolling mills this provision of adjustment is of great practical importance as it obviates the pound and strain on the couplings due to back lash when the mill is reversed. The arms which receive the bearing pins 26 are split and are provided with clamping screws 27 for locking the pins 26 in their adjusted positions. While the blocks and pins are preferably arranged half on one hub and half on the other as shown, it is obvious that they might be otherwise disposed.

The bottoms of each of the bearing blocks 25 are tapped and threaded at 30 for the purpose of receiving retaining bolts to hold them in position when the coupling is shipped to the mill. The retaining bolt (not shown) extends through the hole 31 in the block supporting arm. When the coupling is installed, such retaining bolt is removed, leaving the hole 31, which can be used for oiling. The end of the shaft 10, which is the engine driven shaft, is flat, while the end of the shaft 11, which is the driven or floating shaft, has a thin spacing piece or projection 35 formed thereon which separates the ends of the shafts and allows the necessary rocking movement between them. The other end of the driven or floating shaft 11 is provided with a second flexible coupling connecting it with the pinion or roll shaft of the mill. As can be readily seen, the flexible coupling supports the end of the floating shaft 11 so that a separate bearing for such shaft is not necessary.

It is to be understood that the present invention is not limited to the details of its illustrated embodiment, but may be embodied in other constructions of shaft couplings, within the scope of the following claims.

I claim:

1. A flexible shaft coupling, comprising a driving member and a driven member having a plurality of pairs of contacting bearing surfaces, and means for relatively adjusting each pair of surfaces, substantially as described.

2. A flexible shaft coupling, comprising a driving member and a driven member each having a plurality of forwardly and backwardly facing bearing surfaces, the forwardly facing bearing surfaces of one member engaging the backwardly facing bearing surfaces of the other member, and means for relatively adjusting toward and from each other the bearing surfaces forming such engaging pairs, substantially as described.

3. A flexible shaft coupling, comprising a driving member and a driven member having a plurality of pairs of contacting bearing surfaces, blocks supported by some of said members and having a limited rocking movement relative thereto, at least one of the bearing surfaces of each pair being formed on one of said blocks, and means for relatively adjusting each pair of bearing surfaces toward and from each other, substantially as described.

4. A flexible shaft coupling, comprising a driving member and a driven member, one of said members having a substantially hemispherical bearing block mounted to have a limited rocking movement relative to its supporting member and the other member having a bearing surface engaging the flat surface of said hemispherical bearing block, and means for adjusting said surfaces toward and from each other, substantially as described.

5. A flexible shaft coupling, comprising a driving member and a driven member having a plurality of interfitting arms, substantially hemispherical bearing blocks mounted in some of said arms to have a limited rocking movement therein, and other of said arms having coöperating flat bearing surfaces engaging the flat surfaces of said hemispherical blocks, substantially as described.

6. A flexible shaft coupling, comprising a driving member and a driven member having a plurality of interfitting arms, flat faced bearing blocks mounted in some of said arms to have a limited rocking movement therein, other of said arms having coöperating bearing faces engaging the flat faces of said blocks and means for relatively adjusting such engaging faces, substantially as described.

7. A flexible shaft coupling, comprising a driving member and a driven member having a plurality of interfitting arms, substantially hemispherical bearing blocks mounted in some of said arms to have a limited rocking movement therein and having their flat faces lying in planes extending substantially radially from the shaft axes and other of said arms having substantially flat bearing surfaces lying in planes extending substantially radially through the shaft axes and fitting against the flat surfaces of the hemispherical bearing blocks, substantially as described.

8. A flexible shaft coupling, comprising a driving member and a driven member having a plurality of interfitting arms, flat faced bearing blocks mounted in some of the arms to have a limited rocking movement relative thereto, and adjustable pins threaded in other arms having flat bearing faces fitting against the flat faces of said blocks, substantially as described.

In testimony whereof, I have hereunto set my hand.

JULIAN KENNEDY.

Witnesses:
J. W. Kennedy,
H. W. Rano.